US008488458B1

(12) United States Patent
Bishara

(10) Patent No.: US 8,488,458 B1
(45) Date of Patent: Jul. 16, 2013

(54) SECURE UNAUTHENTICATED VIRTUAL LOCAL AREA NETWORK

(75) Inventor: Nafea Bishara, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1257 days.

(21) Appl. No.: 11/170,960

(22) Filed: Jun. 29, 2005

Related U.S. Application Data

(60) Provisional application No. 60/694,843, filed on Jun. 28, 2005.

(51) Int. Cl.
*G01R 31/08* (2006.01)

(52) U.S. Cl.
USPC ........ 370/232; 370/230; 370/230.1; 370/231; 370/233; 370/234; 370/235; 370/236

(58) Field of Classification Search
USPC ................. 370/230–236, 493–495, 389, 392, 370/356, 354; 709/220–222, 204, 223–226
See application file for complete search history.

(56) References Cited

U.S. PATENT DOCUMENTS

| | | | | |
|---|---|---|---|---|
| 6,092,113 | A * | 7/2000 | Maeshima et al. | 709/230 |
| 6,469,986 | B1 * | 10/2002 | Lecheler et al. | 370/252 |
| 6,560,231 | B1 * | 5/2003 | Kawakami et al. | 370/395.43 |
| 6,950,628 | B1 * | 9/2005 | Meier et al. | 455/41.2 |
| 7,016,956 | B2 * | 3/2006 | Dobbins et al. | 709/224 |
| 7,099,332 | B2 * | 8/2006 | Leung | 370/395.42 |
| 7,227,859 | B1 * | 6/2007 | Finn et al. | 370/354 |
| 7,333,432 | B1 * | 2/2008 | Mor et al. | 370/230.1 |
| 7,453,995 | B1 * | 11/2008 | Bales et al. | 379/112.01 |
| 2003/0076849 | A1 * | 4/2003 | Morgan et al. | 370/412 |
| 2004/0064575 | A1 * | 4/2004 | Rasheed et al. | 709/232 |
| 2005/0073952 | A1 * | 4/2005 | Champlin et al. | 370/229 |
| 2005/0276263 | A1 * | 12/2005 | Suetsugu et al. | 370/389 |

OTHER PUBLICATIONS

IEEE Std 802.1X—2004 (Revision of IEEE Std 801.1X—2001); IEEE Standard for Local and metropolitan area networks, Port-Based Network Access Control, IEEE Computer Society, Sponsored by the LAN/MAN Standards Committee; Dec. 13, 2004; 179 pages.
IEEE Std 802.1X—2001, IEEE Standard for Local and metropolitan area networks—Port-Based Network Access Control; Sponsored by the LAN/MAN Standards Committee fo the IEEE Computer Society, Approved Jun. 14, 2001 by the IEEE-SA Standards Board and Oct. 25, 2001 by the American National Standards Insitute; 149 pages.

* cited by examiner

*Primary Examiner* — Michael Thier
*Assistant Examiner* — Redentor Pasia

(57) ABSTRACT

An apparatus having a corresponding method and computer program comprises a control circuit to determine a number N of network devices belonging to a virtual local area network, wherein the virtual local area network does not require authentication of the network devices; and a policy circuit to limit an aggregate data rate of the virtual local area network according to the number N of network devices belonging to the virtual local area network.

20 Claims, 2 Drawing Sheets

SECURE UNAUTHENTICATED VIRTUAL LOCAL AREA NETWORK

This application claims the benefit of U.S. Provisional Application No. 60/694,843, filed on Jun. 28, 2005, which is hereby incorporated herein by reference in its entirety.

BACKGROUND

The present invention relates generally to virtual local area networks (LAN). More particularly, the present invention relates to secure VLANs for voice communications.

Local area networks (LANs) are often deployed in environments that permit unauthorized devices to be attached to the LAN, or that permit unauthorized users to attempt to access the LAN through equipment already attached to the LAN. Examples of such environments include corporate LANs that provide connectivity in public conference rooms. One approach to securing VLANs in such LANs is to employ authentication mechanisms such as those are specified in IEEE Standard 802.1x.

However, in the case of a voice VLAN, authentication mechanisms cannot be employed because the Internet-Protocol (IP) phones are not able to comply with authentication mechanisms. Because voice VLANs are not secure, they are vulnerable to attacks such as denial-of-service attacks.

SUMMARY

In general, in one aspect, the invention features an apparatus comprising a control circuit to determine a number N of network devices belonging to a virtual local area network, wherein the virtual local area network does not require authentication of the network devices; and a policy circuit to limit an aggregate data rate of the virtual local area network according to the number N of network devices belonging to the virtual local area network.

In some embodiments, the policy circuit limits the aggregate data rate of the virtual local area network to $K=N \times M$, where M is a predetermined data rate. In some embodiments, the virtual local area network communicates voice data. In some embodiments, the policy circuit rejects traffic on the virtual local area network that does not comply with a member of a predetermined set of protocols. In some embodiments, the predetermined set of protocols is selected from the group consisting of one or more voice-over-Internet-Protocol (VOIP) protocols; and one or more network management protocols. In some embodiments, a network switch comprising the apparatus. In some embodiments, the network switch further comprises one or more ports to exchange packets of data with the network devices; and a packet processor to transfer the packets of data among the ports. In some embodiments, a router comprises the network switch.

In general, in one aspect, the invention features an apparatus comprising control means for determining a number N of network devices belonging to a virtual local area network, wherein the virtual local area network does not require authentication of the network devices; and policy means for limiting an aggregate data rate of the virtual local area network according to the number N of network devices belonging to the virtual local area network.

In some embodiments, the policy means limits the aggregate data rate of the virtual local area network to $K=N \times M$, where M is a predetermined data rate. In some embodiments, the virtual local area network communicates voice data. In some embodiments, the policy means rejects traffic on the virtual local area network that does not comply with a member of a predetermined set of protocols. In some embodiments, the predetermined set of protocols is selected from the group consisting of one or more voice-over-Internet-Protocol (VOIP) protocols; and one or more network management protocols. In some embodiments, a network switch comprising the apparatus. In some embodiments, the network switch further comprises one or more means for exchanging packets of data with the network devices; and means for transferring the packets of data among the means for communicating. In some embodiments, a router comprises the network switch.

In general, in one aspect, the invention features a method comprising determining a number N of network devices belonging to a virtual local area network, wherein the virtual local area network does not require authentication of the network devices; and limiting an aggregate data rate of the virtual local area network according to the number N of network devices belonging to the virtual local area network.

In some embodiments, limiting the aggregate data rate comprises limiting the aggregate data rate of the virtual local area network to $K=N \times M$, where M is a predetermined data rate. In some embodiments, the virtual local area network communicates voice data. Some embodiments comprise rejecting traffic on the virtual local area network that does not comply with a member of a predetermined set of protocols. In some embodiments, the predetermined set of protocols is selected form the group consisting of one or more voice-over-Internet-Protocol (VOIP) protocols; and one or more network management protocols. Some embodiments comprise exchanging packets of data with the network devices.

In general, in one aspect, the invention features a computer program comprising determining a number N of network devices belonging to a virtual local area network, wherein the virtual local area network does not require authentication of the network devices; and limiting an aggregate data rate of the virtual local area network according to the number N of network devices belonging to the virtual local area network. In some embodiments, limiting the aggregate data rate comprises limiting the aggregate data rate of the virtual local area network to $K=N \times M$, where M is a predetermined data rate. In some embodiments, the virtual local area network communicates voice data. Some embodiments comprise rejecting traffic on the virtual local area network that does not comply with a member of a predetermined set of protocols. In some embodiments, the predetermined set of protocols is selected form the group consisting of one or more voice-over-Internet-Protocol (VOIP) protocols; and one or more network management protocols.

The details of one or more implementations are set forth in the accompanying drawings and the description below. Other features will be apparent from the description and drawings, and from the claims.

Figure 1:
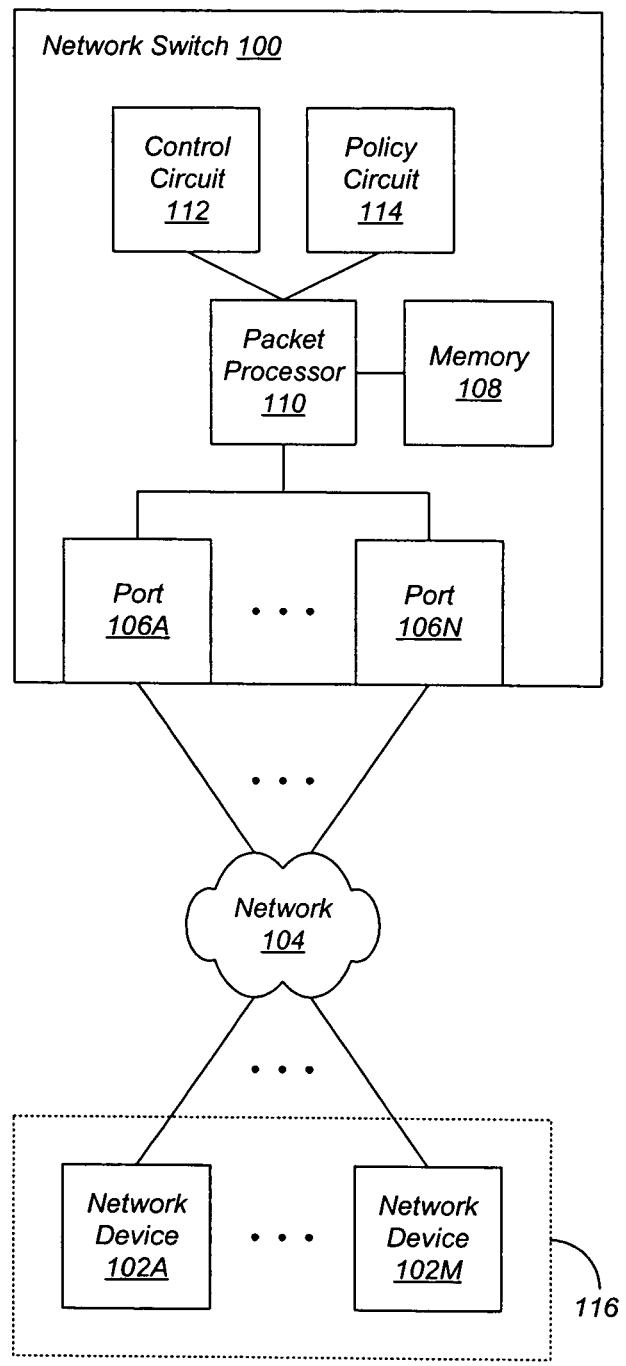
FIG. 1 shows a network switch in communication with a plurality of network devices over a network according to a preferred embodiment of the present invention.

The leading digit(s) of each reference numeral used in this specification indicates the number of the drawing in which the reference numeral first appears.

DETAILED DESCRIPTION

Embodiments of the present invention provide virtual local-area networks (VLANs) that do not employ authentication mechanisms yet are secure from attacks such as denial-of-service attacks. For example, embodiments of the present invention provide an apparatus such as a network switch or router that determines the number N of network devices belonging to a VLAN that does not require authentication, and limits an aggregate data rate of the VLAN to K=N×M, where M is a predetermined data rate such as the bidirectional data rate for a single IP phone. Some embodiments additionally reject traffic on the VLAN that does not comply with a member of a predetermined set of protocols such as Real-time Transport Protocol (RTP), which is commonly used for voice-over-Internet-Protocol (VOIP) communications.

FIG. 1 shows a network switch 100 in communication with a plurality of network devices 102A-M over a network 104 according to a preferred embodiment of the present invention. While embodiments of the present invention are discussed with reference to network switch 100, it will be apparent to one skilled in the relevant art after reading this description that embodiments of the present invention include routers and other sorts of network devices as well.

Network switch 100 comprises a plurality of ports 106A-N to exchange packets of data with network devices 102, a memory 108 to store one or more forwarding tables for network switch 100, a packet processor 110 to transfer packets of data among ports 106 according to the contents of the forwarding table(s), a control circuit 112, and a policy circuit 114.

For the purposes of this description, network devices 102A-M belong to a VLAN 116. VLAN 116 can be defined in several ways, as is well-known in the relevant arts. Embodiments of the present invention are independent of the way in which VLAN 116 is formed. Of course, network switch 100 can communicate with other network devices that do not belong to VLAN 116 as well. For clarity network devices not belonging to VLAN 116 are not shown in FIG. 1.

VLAN 116 is an unauthenticated VLAN, meaning that the network devices 102A-M that belong to VLAN 116 are not required to be authenticated. Unauthenticated VLANs are especially useful for communicating voice data. In some embodiments of the present invention, VLAN 116 is a voice VLAN for communicating voice data. In such embodiments, network devices 102A-M can be Internet Protocol (IP) phones for voice-over-IP (VOIP) voice communications. However, embodiments of the present invention are not limited to voice communications.

Figure 2:
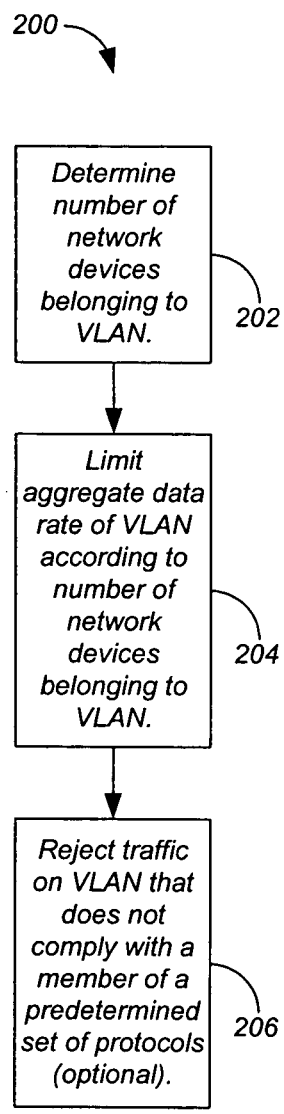
FIG. 2 shows a process for network switch according to a preferred embodiment of the present invention.

FIG. 2 shows a process for network switch 100 according to a preferred embodiment of the present invention. As before, while embodiments of the present invention are discussed with reference to network switch 100, it will be apparent to one skilled in the relevant art after reading this description that embodiments of the present invention include routers and other sorts of network devices as well.

Control circuit 112 determines the number N of network devices 102 belonging to VLAN 116 (step 202). The number N of network devices 102 belonging to VLAN 116 can be determined in several ways, as is well-known in the relevant arts. Embodiments of the present invention are independent of the way in which the number N of network devices 102 belonging to VLAN 116 is determined. As noted before, VLAN 116 does not require authentication of network devices 102.

Policy circuit 114 limits the aggregate data rate of VLAN 116 according to the number N of network devices 102 belonging to VLAN 116 (step 204). In some embodiments, policy circuit 114 limits the aggregate data rate of VLAN 116 to K=N×M, where M is a predetermined data rate. For example, in a VOIP application, M can be the bidirectional data rate for a single IP phone. The aggregate data rate of VLAN 116 can be limited in several ways, as is well-known in the relevant arts. For example, traffic can be limited globally for network switch 100, or on a per-port 106 basis. Traffic can be limited in other ways as well, for example by input and/or output traffic shaping. Embodiments of the present invention are independent of the way in which the aggregate data rate of VLAN 116 is limited.

In some embodiments policy circuit 114 optionally rejects traffic on VLAN 116 that does not comply with a member of a predetermined set of protocols (step 206). The traffic can be rejected in several ways, as is well-known in the relevant arts. Embodiments of the present invention are independent of the way in which traffic is rejected.

For example, in a VOIP application, the predetermined set of protocols can consist of one or more VOIP protocols including dataplane protocols, signaling protocols, and network management protocols. VOIP protocols include Real-time Transport Protocol (RTP), RTP Control Protocol (RTCP), ITU-T standard H.323, the IETF Session Initiation Protocol (SIP) standard, and Media Gateway Control Protocol (MGCP). Network management protocols include Dynamic Host Configuration Protocol (DHCP) for setting up IP addresses and Trivial File Transfer Protocol (TFTP) for downloading firmware images to the IP Phone. These protocols are listed by way of illustration, and not by way of limitation.

Embodiments of the present invention secure unauthenticated VLANs from attacks such as denial-of-service attacks. For example, by limiting the aggregate data rate of an unauthenticated VLAN based on the number of network devices belonging to the VLAN, embodiments of the present invention prevent an attacker from flooding the VLAN with an excessive amount of traffic. As another example, by rejecting traffic on an unauthenticated VLAN that does not comply with a member of a predetermined set of protocols, embodiments of the present invention prevent an attacker on the VLAN from transmitting control packets to a processor controlling the network switch.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
a control circuit configured to
determine a number N of network devices belonging to a virtual local area network, wherein the virtual local area network does not require authentication of the network devices, and wherein N is an integer greater than one,
in response to each additional network device that joins the virtual local area network, increase the number N of network devices belonging to the virtual local area network, and
in response to each of the network devices belonging to the virtual local area network that leaves the virtual local area network, decrease the number N of network devices belonging to the virtual local area network; and
a policy circuit configured to
calculate a first rate based on the number N of network devices belonging to the virtual local area network;
dynamically limit an aggregate data rate of the virtual local area network to the first rate, wherein the first rate is less than total network bandwidth available to the virtual local area network;
update the first rate in response to changes in the number N of network devices belonging to the virtual local area network; and
dynamically limit the aggregate data rate of the virtual local area network to the first rate as updated.

2. The apparatus of claim 1:
wherein the policy circuit is configured to set the first rate to K=N×M, where M is a predetermined data rate.

3. The apparatus of claim 1:
wherein the virtual local area network is configured to communicate voice data.

4. The apparatus of claim 1:
wherein the policy circuit is configured to reject traffic on the virtual local area network that does not comply with a member of a predetermined set of protocols.

5. The apparatus of claim 4, wherein the predetermined set of protocols is selected from the group consisting of:
one or more voice-over-Internet-Protocol (VOIP) protocols; and
one or more network management protocols.

6. A network switch comprising the apparatus of claim 1.

7. The network switch of claim 6, further comprising:
one or more ports configured to exchange packets of data with the network devices; and
a packet processor configured to transfer the packets of data among the ports.

8. The apparatus of claim 1, wherein the virtual local area network is reserved for voice-over-Internet-Protocol (VOIP) phones.

9. A method performed by a computer networking device, the method comprising:

determining a number N of network devices belonging to a virtual local area network, wherein the virtual local area network does not require authentication of the network devices, and wherein N is an integer greater than one;
in response to each additional network device that joins the virtual local area network, increasing the number N of network devices belonging to the virtual local area network;
in response to each of the network devices belonging to the virtual local area network that leaves the virtual local area network, decreasing the number N of network devices belonging to the virtual local area network;
calculating a first rate based on the number N of network devices belonging to the virtual local area network;
dynamically limiting an aggregate data rate of the virtual local area network to the first rate, wherein the first rate is less than total network bandwidth available to the virtual local area network, and wherein the determining, the calculating, and the limiting are performed by the computer networking device;
updating the first rate in response to changes in the number N of network devices belonging to the virtual local area network; and
dynamically limiting the aggregate data rate of the virtual local area network to the first rate as updated.

10. The method of claim 9, wherein calculating the first rate comprises:
setting the first rate to K=N×M, where M is a predetermined data rate.

11. The method of claim 9:
wherein the virtual local area network communicates voice data.

12. The method of claim 9, further comprising:
rejecting traffic on the virtual local area network that does not comply with a member of a predetermined set of protocols.

13. The method of claim 12, wherein the predetermined set of protocols is selected from the group consisting of:
one or more voice-over-Internet-Protocol (VOIP) protocols; and
one or more network management protocols.

14. The method of claim 9, wherein the virtual local area network is reserved for voice-over-Internet-Protocol (VOIP) phones.

15. A computer program stored on a non-transitory computer-readable medium for use by a processor, the computer program comprising instructions for:
determining a number N of network devices belonging to a virtual local area network, wherein the virtual local area network does not require authentication of the network devices, wherein N is an integer greater than one;
in response to each additional network device that loins the virtual local area network, increasing the number N of network devices belonging to the virtual local area network;
in response to each of the network devices belonging to the virtual local area network that leaves the virtual local area network, decreasing the number N of network devices belonging to the virtual local area network;
calculating a first rate based on the number N of network devices belonging to the virtual local area network;
dynamically limiting an aggregate data rate of the virtual local area network to the first rate, wherein the first rate is less than total network bandwidth available to the virtual local area network;

updating the first rate in response to changes in the number N of network devices belonging to the virtual local area network; and dynamically limiting the aggregate data rate of the virtual local area network to the first rate as updated.

16. The computer program of claim 15, wherein the instructions for calculating the first rate comprise instructions for:

setting the first rate to K=N×M, where M is a predetermined data rate.

17. The computer program of claim 15:

wherein the virtual local area network communicates voice data.

18. The computer program of claim 15, further comprising instructions for:

rejecting traffic on the virtual local area network that does not comply with a member of a predetermined set of protocols.

19. The computer program of claim 18, wherein the predetermined set of protocols is selected from the group consisting of:

one or more voice-over-Internet-Protocol (VOIP) protocols; and one or more network management protocols.

20. The computer program of claim 15, wherein the virtual local area network is reserved for voice-over-Internet-Protocol (VOIP) phones.

* * * * *